Patented Mar. 18, 1930

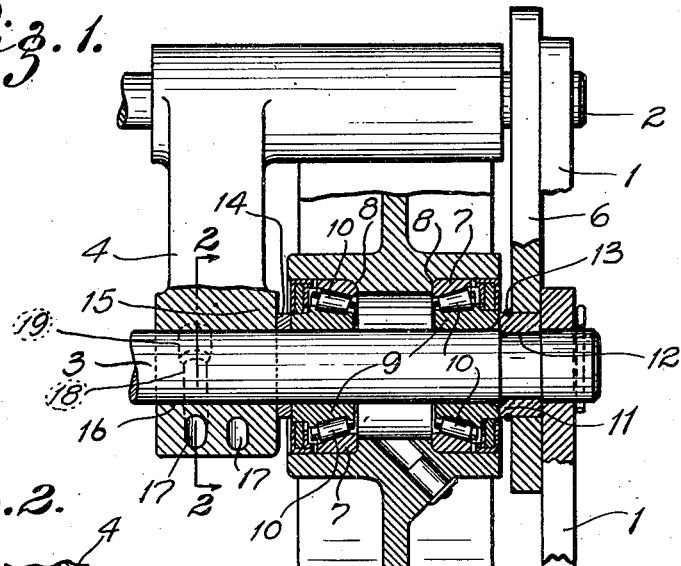
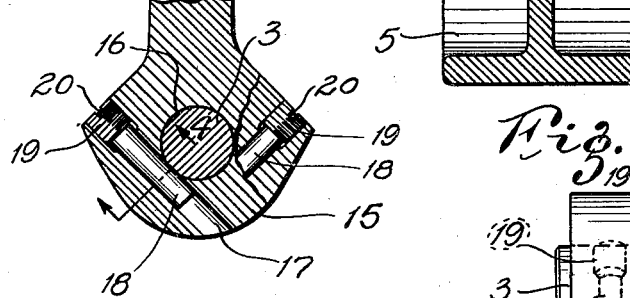
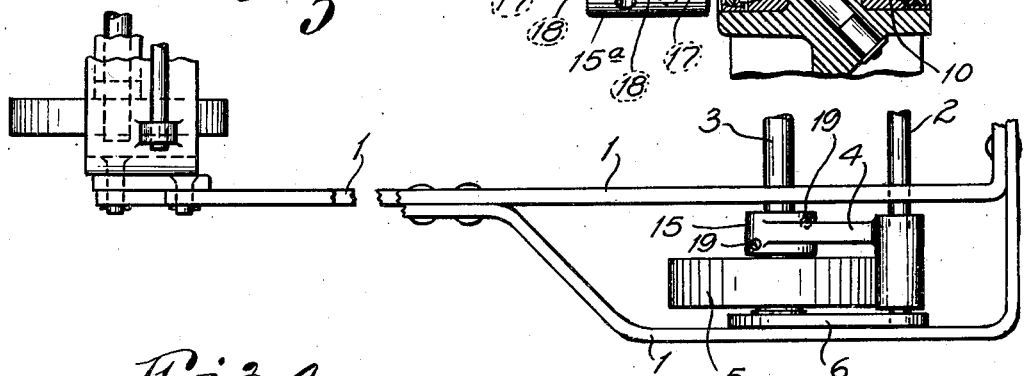
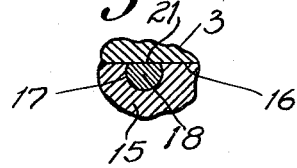

1,751,134

UNITED STATES PATENT OFFICE

GEORGE W. CURTIS, OF MILWAUKEE, WISCONSIN, ASSIGNOR TO THE TIMKEN ROLLER BEARING COMPANY, OF CANTON, OHIO, A CORPORATION OF OHIO

BEARING CONSTRUCTION

Application filed November 11, 1926. Serial No. 147,629.

My invention relates to bearing constructions and processes of assembling the same, particularly to means for securing axle or hub bearings in position, such means including means for properly positioning the bearings in the first place and for adjusting them later. The invention is particularly applicable to wheel hub bearings in which two conical roller bearings are interposed between the hub of the wheel and the axle member on which the wheel is mounted.

The invention has for its principal object, means for easily positioning the bearings and for accurately securing them in place.

The invention consists principally in securing bearings in position by means of a collar or the like abutting against the end of a bearing member and secured to an axle or shaft by means of angularly disposed wedge pins fitted in bores in said collar and having flat tapered surfaces bearing against said axle or shaft. The invention further consists in the bearing arrangement and in the parts and combinations and arrangements of parts hereinafter described and claimed.

In the accompanying drawing,

Fig. 1 is a sectional view of an axle bearing embodying my invention:

Fig. 2 is a detail sectional view on the line 2—2 of Fig. 1;

Fig. 3 is a part plan view of a lift truck, showing the invention embodied therein;

Fig. 4 is a detail sectional view on the line 4—4 of Fig. 2; and

Fig. 5 is a part sectional view, part elevation showing a slightly different embodiment of the invention.

In the construction shown in Figs. 1-4, inclusive, the invention is shown embodied in a "lift truck" which has a platform that is raised after the truck is loaded, the raising being accomplished by lowering the truck handle preparatory to pulling the truck. Frame members 1 of the truck are pivotally secured to a shaft 2 that is connected to the truck axle 3 by a bracket member 4 on one side of the truck wheel 5 and also, if desired, by an arm 6 on the other side of said wheel. Said frame members are operatively connected to the truck handle to be swung upwardly as said handle is lowered.

Bearing cups 7 are mounted against shoulders 8 in the ends of the wheel hub, bearing cones 9 are mounted on said axle 3 which extends through the wheel hub and taper rollers 10 are interposed between said cups and cones. One bearing cone 9 abuts against a shoulder 11 or other suitable abutment on the axle. The abutment illustrated in Fig. 1 is a split sleeve that is mounted in a groove 12 in said axle and is held in place by a spring ring 13. The other bearing cone 9 abuts against a ring 14 interposed between it and the end portion 15 of said bracket 4. Said bracket is provided with a bore 16 in said end 15 in which bore said axle 3 is mounted; and said bracket is pinned to the axle.

Said end or collar portion 15 of said bracket 4 is provided with angularly disposed holes 17 therethrough, each hole opening along one edge into the main bore 16 in which said axle 3 fits. In each of said holes 17 is disposed a pin 18 with a tapered flat portion. Each pin 18 is held in position by means of a set screw 19, said set screw being locked in position, as by a cotter pin 20. The flat tapered edge portion 21 of each pin 18 is adapted to engage the axle 3. Thus when the two wedge pins 18 are properly driven tight against opposite sides of the axle, the axle is firmly engaged thereby.

In positioning the device, the bearings are put in place and the bracket member 4 is positioned with the locking collar portion 15 thereof against a bearing cone 9. Then the first pin 18 is put in its hole 17 and lightly tapped to give it a light press fit. Then the bracket 4 is forced along the axle, as by tapping it, to obtain proper adjustment of the bearings, such adjustment permitting free turning of the wheel 5 without end play. After the bearings have been properly adjusted the first pin 18 is forced in place as securely as possible and the set screw 19 positioned, and locked. After this the second pin 18 is positioned, forced into place and secured by means of its set screw 19.

Fig. 5 shows a different embodiment of the invention. In this construction one bearing cone 9 abuts against a shoulder 30 that is integral wth the axle 3. A locking collar 15ª is mounted on the end of the axle, abutting against the other bearing cone 9. Said locking collar 15ª is secured to the axle in the same way as the locking portion 15 of said bracket 4, and the process of assembling is the same as that above described.

The above described construction firmly secures bearings in proper position, it simplifies the operation of assembling and adjusting the bearings and securing them in place and it is simple and strong. Obviously numerous changes may be made without departing from the invention and I do not wish to be limited to the precise construction shown.

What I claim is:

1. In a bearing construction, an axle having a smooth cylindrical surface, a bearing member thereon, a collar for holding said bearing member in place and angularly disposed pins extending through bores in said collar and engaging said axle along their sides.

2. In a bearing construction, a shaft having a smooth cylindrical surface, a bearing member thereon, a collar for holding said bearing member in place and an angularly disposed pin extending through a bore in said collar and having a flat side portion engaging said shaft.

3. In a bearing construction, a shaft having a smooth cylindrical surface, a bearing member thereon, a collar for holding said bearing member in place and angularly disposed wedge pins extending through bores in said collar and each having a tapered flat portion on its side engaging said shaft.

4. An axle bearing construction comprising an axle having a smooth cylindrical surface, a wheel thereon, a conical roller bearing interposed between said axle and said wheel, a collar for securing said roller bearing in position and angularly disposed wedge pins extending through bores provided therefor in said collar and engaging said axle along their sides.

5. An axle bearing construction comprising an axle having a smooth cylindrical surface, a wheel thereon, conical roller bearings interposed between said axle and said wheel, an abutment at one end for said bearings, a collar at the other end for securing said roller bearings in position and angularly disposed pins extending through bores provided therefor in said collar and engaging said axle along their sides.

6. An axle bearing construction comprising an axle, a conical roller bearing thereon, a wheel mounted on said roller bearing, a shaft, an angular bracket member having a tubular portion mounted on said shaft and having an opening receiving said axle, the end portion of an arm of said bracket member constituting the adjusting and securing device for said roller bearing and means for securing said end portion of said bracket member to said axle.

7. An axle bearing construction comprising an axle, a conical roller bearing thereon, a wheel mounted on said roller bearing, a shaft, an angular bracket member having a tubular portion mounted on said shaft and having an opening receiving said axle, the end portion of an arm of said bracket member constituting the adjusting and securing device for said roller bearing and means for securing said end portion of said bracket member to said axle said means comprising angularly disposed wedge pins extending through openings provided therefor in said bracket and engaging said axle.

8. A construction of the kind described, comprising a shaft, a frame member pivotally secured thereto, an axle, a wheel thereon, a pair of inner bearing members mounted on said axle, bearing rollers on said inner bearing members, outer bearing members for said bearing rollers, a wheel carrying said outer bearing members in its hub, an abutment on said axle for one of said bearing members and a bracket secured to said shaft and to said axle, said bracket constituting the positioning and securing means for the other of said inner bearing members.

9. A construction of the kind described, comprising a shaft, a frame member pivotally secured thereto, an axle, a wheel thereon, a pair of inner bearing members mounted on said axle, bearing rollers on said inner bearing members, outer bearing members for said bearing rollers, a wheel carrying said outer bearing members in its hub, an abutment on said axle for one of said bearing members, a bracket secured to said shaft and to said axle, said bracket constituting the positioning and securing means for the other of said inner bearing members said bracket having an opening receiving said axle and having angularly disposed passageways opening into said axle receiving opening and wedge pins in said passageways engaging said axle.

Signed at Milwaukee, Wisconsin, this 5th day of November, 1926.

GEORGE W. CURTIS.